United States Patent [19]
Fetter

[11] 4,014,019
[45] Mar. 22, 1977

[54] REAL TIME ANALOG DOPPLER PROCESSOR FOR WEATHER RADAR

[75] Inventor: Richard W. Fetter, Warrenville, Ill.

[73] Assignee: The United States of America as represented by the Secretary of the Navy, Washington, D.C.

[22] Filed: Sept. 11, 1975

[21] Appl. No.: 612,385

[52] U.S. Cl. .................. 343/5 W; 343/5 SA; 343/7.7; 356/103
[51] Int. Cl.² .................................... G01S 9/60
[58] Field of Search .......... 343/5 W, 5 SA; 356/28, 356/103; 343/7.7

[56] References Cited
UNITED STATES PATENTS

| | | | |
|---|---|---|---|
| 3,447,153 | 5/1969 | Maguire | 343/5 W |
| 3,573,824 | 4/1971 | Armstrong | 343/5 W |
| 3,795,912 | 3/1974 | Pierce et al. | 343/5 SA |
| 3,803,601 | 4/1974 | Serafin | 343/5 W |

Primary Examiner—Maynard R. Wilbur
Assistant Examiner—S. C. Buczinski
Attorney, Agent, or Firm—Richard S. Sciascia; George A. Montanye

[57] ABSTRACT

A technique for processing the IF portion of a radar return signal in order to produce a continuous voltage output which voltage is proportional to the instantaneous frequency of the received signal. The technique employs an amplitude limiter and a wideband discriminator comprised of a delay line and phase detector followed by a video amplifier for processing the desired output signal. The output signal is indicative of velocity of precipitation in the radar target range. This information may be employed to detect and measure the degree and intensity of precipitation fall velocities, winds within a storm and other velocity dependent characteristics.

3 Claims, 8 Drawing Figures

REAL TIME ANALOG DOPPLER PROCESSOR FOR WEATHER RADAR

The invention described herein may be manufactured and used by or for the Government of the United States of America for governmental purposes without the payment of any royalties thereon or therefor.

BACKGROUND OF THE INVENTION

This application is related to my co-pending application entitled "Radar Detection of Turbulence in Precipitation," Ser. No. 612,384, having the same filing date as this application.

This invention relates to the detection and measurement of velocity of radar targets in general and in particular to an analog technique for processing small Doppler shifts in frequencies of pulsed radar return signals from precipitation targets.

The detection and measurement of precipitation velocities has application in meteorology and aviation. In the field of meteorology, the study of these velocities and their associated effect on general weather conditions (such as cloud formation and other significant weather behavior) leads to a more accurate and complete forecast of weather patterns and aids in meteorological research. More importantly however, the study of atmospheric wind velocities is of general concern to the field of aviation in order that aircraft may be properly apprised of and avoid hazardous conditions. Reflected radar returns from rain, snow, hail, and ice provide a means of indicating the wind velocity in the general location of such precipitation. The pulsed radar returns from such meteorological targets are in the nature of a complex waveform having rapid fluctuations in amplitude and phase. The fluctuation rates are usually limited only by the pulse width or the bandwidth of the receiver. The complex nature of the signal represents the vector summation of the simultaneous returns from the plurality of scatterers in the radar pulse volume. The size, spatial position and velocity of the precipitation particles relative to the radar contributes to the nature of the received signal. This affects the instantaneous and average intensity and the instantaneous and mean frequencies as well as the statistical properties of these parameters.

Doppler radar provides a suitable technique for measuring relative motion between precipitation targets such as ice, snow, and rain, and the radar itself. The velocity of this precipitation is therefore an indirect indication of the movement of the winds. Moreover Doppler radar also provides a means for measuring the intensity of the precipitation because the radar is capable of measuring reflections which are proportional to the size and quantity of the rain, snow, ice, and hail returns. That is to say an increase in the quantity of the precipitation results in an increased return, and accordingly the magnitude of the precipitation is detected and indicated by the Doppler radar. Since the size and quantity of precipitation varies in location and direction throughout a particular storm, it becomes desirable to obtain an indication of storm intensity as a function of distance and location from the radar source. Doppler radar is also particularly well suited for detecting the velocity of radar returns moving toward or away from the radar source. A comparison of the movement of particles in adjacent spatial volumes of the radar beam gives an indication of the perturbations in the horizontal and vertical air movement. However, while crude velocity estimates have been obtained with conventional non-coherent radar, precise measurements have required the use of more complex and more expensive coherent radar.

There are significant drawbacks for the use of Doppler radar to provide storm intensity data, and velocity dependent characteristics. Specifically, methods presently exist to obtain precipitation velocity information from Doppler radar. All of these methods required a measurement to be made on a large nunber of samples of the return signal at each range (i.e. a specific distance from the radar source). Such techniques include the use of a simple boxcar circuitry which samples each return and holds the value until the next return and then employs a filter to provide a sinusoidal estimate of the mean Doppler frequency. To obtain this desired result, covering many ranges, large scale digital computers or complex data processors capable of storing many samples are employed and then are used to perform complex mathematical analysis of the values to obtain mean frequency indicative of the Doppler shift, the variance and the power spectral density of the return at that range. This must be done for each range and as a result the number of calculations is large.

Furthermore, because of the random nature of the return signal these methods require long sampling and computer times to provide usable data. All of the methods presently available are limited by the number of ranges at which they are capable of making measurements unless extremely large numbers of circuits are combined with an adequate computer to provide simultaneous storage and computation. This situation has proven to be unacceptable.

Other systems employ more simple circuitry and are sensitive to the spectral shape of the return signal. However, these systems are also limited by the sampling rate of the radar system to the measurement of frequencies less than the pulse repetition frequencies so that ambiguities and frequency folding of the data do not destroy the accuracy. The pulse repetition frequency limitations and the large number of samples which are required, combine to force the use of very slow and unacceptable scanning rates for the radar antenna so that the resultant data may very well be meaningless in a fast moving storm situation.

A significant reason for the existence of the problems in the art of singal processing is that the small Doppler shift, usually measured in Hertz, is superimposed upon a radar return having (after conversion) an intermediate frequency in the magaHertz range. In other words the meaningful variation of the return signal is so small when compared with the frequency of the radar return it becomes extremely difficult to remove it and to manipulate it so that useful information can be obtained.

Considering the above drawbacks I have devised a method of providing an instantaneous measurement of the small Doppler shift in the return pulsed radar return from precipitation targets.

It is therefore an object of this invention to provide a simple discrete system for the instantaneous and continuous measurement of small Doppler shifts.

Another object of this invention is to provide an analog technique for processing small Doppler shifts which are indicative of the movement of rain, snow, hail and their fall velocities and other velocity dependent characteristics.

And yet another object of this invention is to provide a technique for measuring small Doppler shifts in a high frequency signal such as a pulsed radar return.

A further object of this invention is to provide such a measurement while retaining a wide bandwidth and high sensitivity.

And yet a further object of this invention is to provide the measurement so that velocities which are expected from tornadoes and the like are readily measured without regard to the pulse repetition frequency of the radar.

Other objects, advantages and novel features of the invention will become apparent from the following detailed description of the invention when considered in conjunction with the accompanying drawings wherein.

Figure 4A:
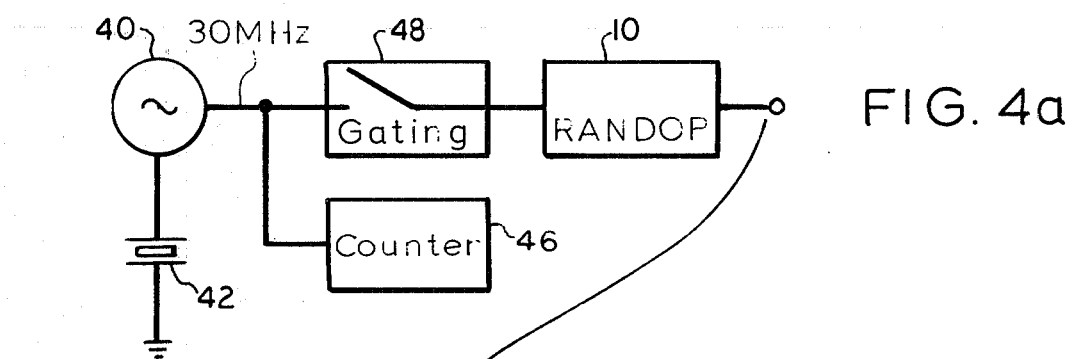
Figure 4C:
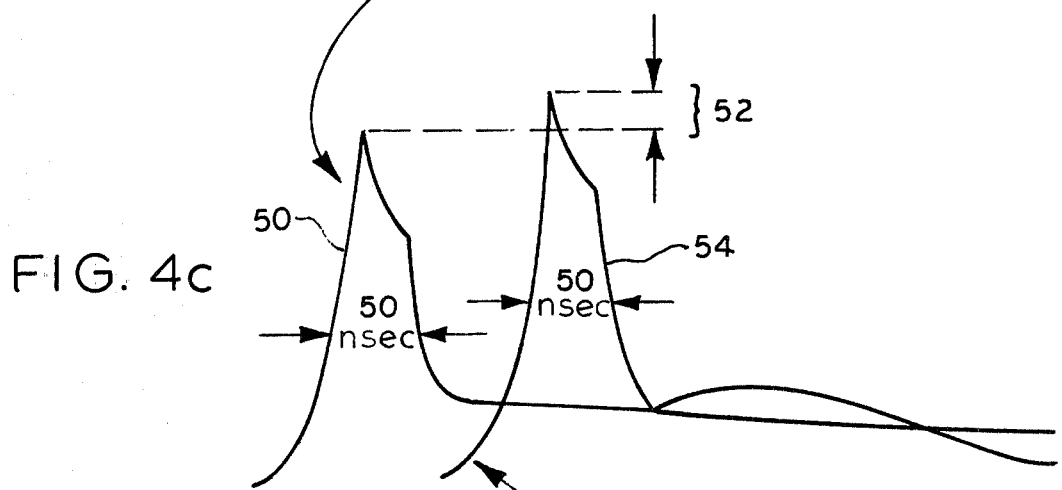
Figure 4B:
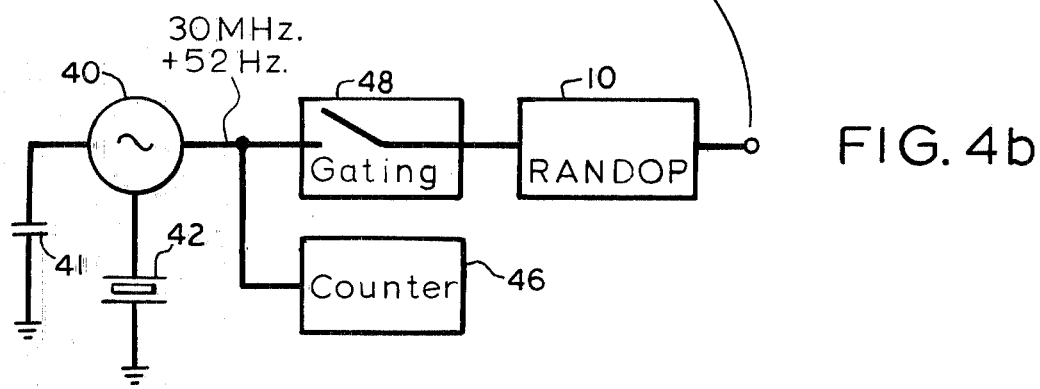

FIGS. 4a, 4b, and 4c show test circuits for providing waveforms to the processor and the resultant waveform outputs.

SUMMARY OF THE INVENTION

This invention employs a frequency discriminator having a bandwidth compatible with the expected rate of frequency change in the return signal which is typically in the range of 0.2 to 10 mHz for most weather radar. The return signal at the IF is first amplified and limited to remove amplitude variations. The frequency variations are then detected in a wideband discriminator so that the frequency variations appear as a voltage proportional to the frequency difference between the received signal and the transmitted or reference frequency which represents zero velocity. The discriminator consists of a delay line and phase detector. The input IF signal is applied to the reference input of the phase detector and the delay line. The delayed version of the signal is then applied to the signal input of the phase detector. The delay established by the delay line is an odd number of the quarter periods of the IF so that the discriminator output may be adjusted to zero for the frequency corresponding to zero velocity. The sense of the velocity is given by the polarity of the output voltage; that is to say, approaching percipitation targets increase the received frequency so that the phase shift due to the delay is no longer a multiple of 90° and so that the phase detector produces an output of one polarity. Receding precipitation targets have the same effect but produce output voltage of the opposite polarity. The discriminator acts in a manner similar to a conventional FM discriminator but with the added constraint that it must function over a comparatively wide frequency band so that it can recover the signal frequency deviation without distortion. The discriminator output voltage is then amplified by a wideband video amplifier to levels suitable for further processing. The limiter and amplifier circuits are conventional and can be realized with many available circuits.

DESCRIPTION OF THE INVENTION

As stated previously, radar returns from weather radar targets are much like frequency modulation (FM) radio broadcasts. The most significant difference is that the modulating signal for radar has a much wider frequency bandwidth than the frequency deviation. For example, a typical FM radio uses audio frequencies for modulating a carrier frequency with deviations up to 750 kiloHertz, whereas radar returns having modulating frequencies in the megaHertz range have deviations (which deviations carry the desired velocity information) in the low audio frequency range.

Figure 1:
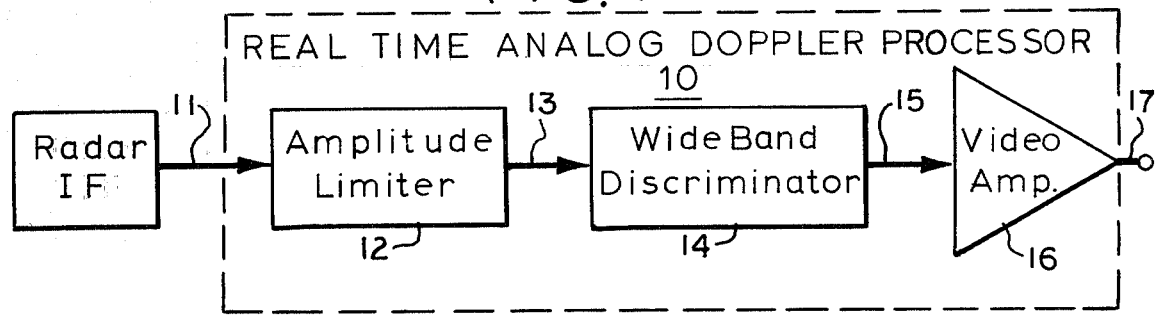
FIG. 1 is a block diagram of the system capable of providing the technique of making instantaneous measurements of small Doppler shifts.

The real time analog Doppler processor (RANDOP) 10 is shown in FIG. 1. IF from the radar is provided to amplitude limiter 12 by line 11. The signal is then provided to wideband discriminator 14 by line 13. The output of the discriminator is fed to video amplifier 16 on line 15. The output of the system is available on output line 17.

Figure 2A:
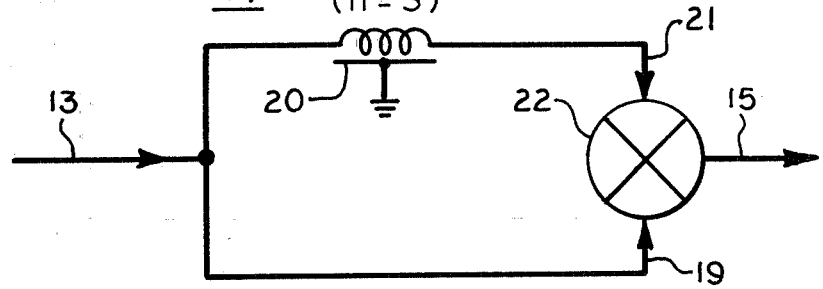
FIG. 2 (a) is a diagram of the wideband discriminator shown in FIG. 1.
FIG. 2(b) is a graph of the response of the wideband discriminator as a function of n and frequency.
FIG. 2(c) depicts the actual frequency response of the discriminator as shown in FIG. 2(a)

In an effort to obtain a sensitive wideband discriminator for detecting such deviations, a very simple but effective device was constructed and is shown in FIG. 2(a). This discriminator, in conjunction with other components are coupled together to provide a real time velocity measurement system as shown in FIG. 1. Referring to FIG.2(a) the wideband discriminator compares the IF signal with the same signal delayed in time by delay line 20. The delay is established to provide a zero velocity (typically a center frequency of 30 megaHertz) relative to the radar. This is accomplished by the adjustment of delay line 20, using an odd number of quarter periods of the center frequency. A comparison of the signals is accomplished by a mixer or detector 22 which multiplies the direct signal 19 and the delayed signal 21 giving equal areas of alternate polarity or a net output of zero when the phase of the two signals differ by exactly $n \times 90°$ at the center frequency. If the received frequency changes, the fixed time delay no longer represents $n \times 90°$ since the period of the signal has changed. The output 15 of the phase detector now has more area of one polarity than the area of the other. This situation yields a net output having a polarity dependent upon the direction of frequency shift and the number of n of quarter periods of delay.

Figure 2B:
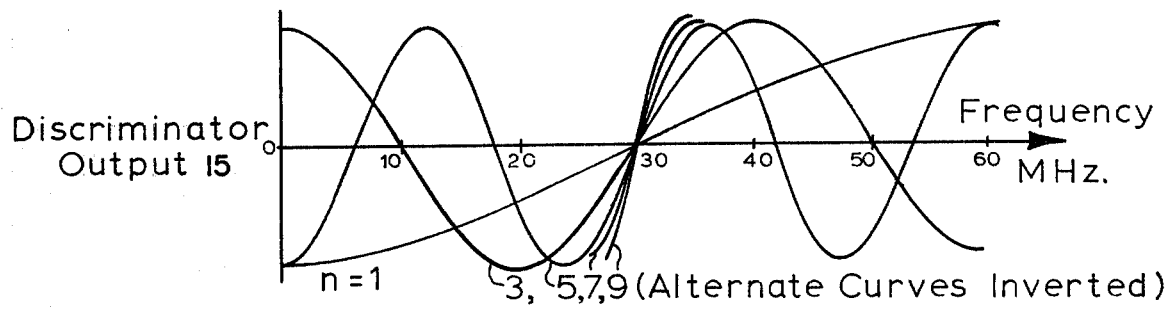
Figure 2C:
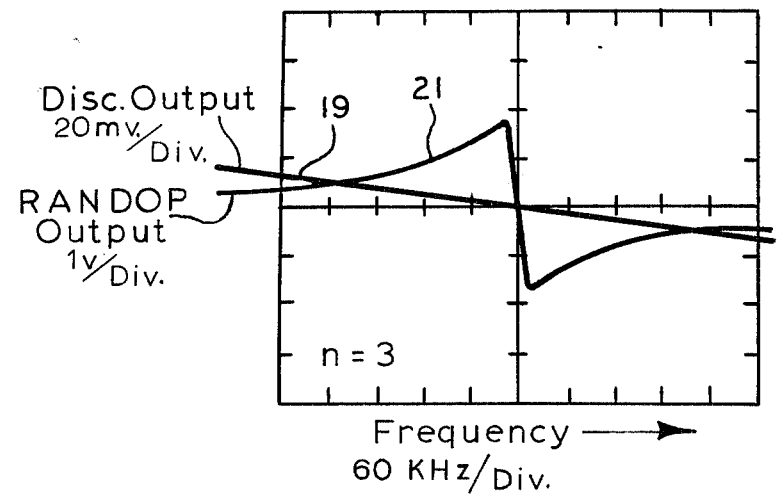

FIG. 2(b) shows discriminator output 15 as a function of n and frequency. The curves for alternate values of $n$ (odd) have been inverted to provide a better showing of the comparison of the slopes at 30 megaHertz. FIG. 2(c) depicts the actual frequency response 13 of the wideband discriminator shown in FIG. 2(a) having a $3 \times 90°$ phase shift. As shown the circuit of FIG. 2(a) is capable of providing a slope 19 of approximately 57 uV/KHz at 30 megaHertz and can be increased by further amplification as shown by curve 21.

The delay established by delay line 20 may be accomplished in several ways by employing either electromagnetic or acoustic delay lines. Although acoustic delay lines are currently much more expensive when compared to electromagnetic delay lines, they are capable of providing an increased discriminator slope by the use of a device having high dispersion so that the delay is a function of the frequency. Three types of electromagnetic delay lines have been successfully employed in the discriminator circuit shown in FIG. 2. They include coaxial, stripline and trough lines of the proper length and a propogation velocity capable of producing the desired delay. A second type of delay line employed includes distributed constant delay lines having a distributed inductance in the form of a long coil wound over a grounded surface so as to provide the necessary distributed capacitance. The third type of delay line includes lumped constant delay line having a series of discrete inductances and capacitances.

Figure 3:
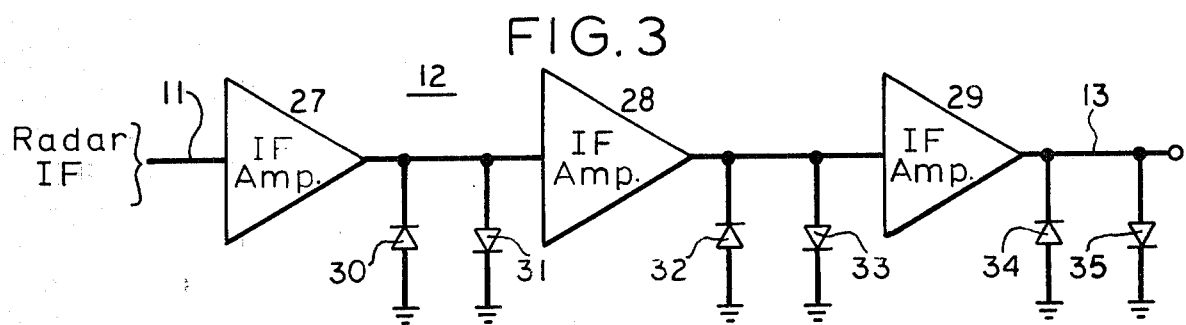
FIG. 3 depicts an amplitude limiter circuit capable of being used with this invention.

FIG. 3 depicts the amplitude limiter circuit 12 shown in FIG. 1. This circuit is necessary since wideband discriminator 14 is sensitive to amplitude as well as frequency. Weather radar signals from severe storms may have amplitude fluctuation of 80 decibels or more indicative of an amplitude range of 10,000 to 1. The limiter, as shown in FIG. 3 may be used to produce a constant amplitude signal without distorting the phase relationship of the zero crossing point of the IF signal. The circuits capable of accomplishing this result include but are not limited to diode or transistor limiters. As shown in FIG. 3, Schottky barrier diodes 30–35 are used to short the IF signal to ground whenever its amplitude exceeds the threshold of the diode in either direction. The series of diodes may be employed at the output of the successive IF amplifiers 27–29. Transistor limiters are generally high gain emitter-coupled amplifiers which saturate at defined signal levels. These devices are obtained in integrated circuit form and such devices include the Fairchild uA719 or any other suitable device.

The amplified output signal 23 may be obtained by video amplifier 16, an off-the-shelf purchase from a variety of sources. Such video amplifiers include but are not limited to such devices as uA733, uA751, uA702, MC1545 and MC1510. In other words there are many possible combinations of discrete active devices capable of providing further amplification of the signal.

FIG. 4 depicts two test circuits and their associated waveforms in the case when $n = 5$. The circuits and waveforms are presented in an effort to further appreciate the sensitivity of the device shown in FIG. 1. FIG. 4(c) shows that a small deviation in frequency has been extracted from a 30 MHz IF frequency. Referring to FIG. 4(a) crystal 42 provides a waveform generator 40 with a frequency of 30 MHz. This signal is counted by counter 46 and gated by gating circuit 48 for a period of 90 nsec. This pulse is provided to the RANDOP circuit 10. The waveform 50 generated by the circuit in FIG. 4(a) (when $n = 5$) is shown in FIG. 4(c). The pulse from RANDOP circuit 10 has a width of 90 nsec minus 40 nsec delay (as a result of the delay in the discriminator) to yield a 50 nsec pulse having a particular amplitude as shown.

The circuit in FIG. 4(b) is identical to the circuit shown in FIG. 4(a) but for a capacitor 41 connected to frequency generator 40 to change the frequency by 52 Hertz. Hence, counter 46 measures the 30 MHz signal + 52 Hz. This pulse is gated thru gating circuit 48 and then thru RANDOP circuit 10 in a manner identical to that stated above. The output is shown as waveform 54 in FIG. 4(c). The difference in amplitude, which in this case is approximately 200 millivolts, represents a change of 52 Hz from the original 30 MHz signal. It should be noted that discriminator delay established by discriminator 14 was approximately 40 nsec so that there was a 50 nsec overlap in the delayed and the direct pulse.

Obviously many modifications and variations of the present invention are possible in the light of the above teachings. For example, the discriminator may be implemented in a variety of different ways: such as wideband versions of typical FM discriminators. Moreover, digital circuits and acoustic-wave devices can be used to provide the necessary functions discussed above. Finally, although there are attendant problems in doing so, the technique disclosed by this invention may also be implemented at the micro-wave frequency of the radar. It is therefore to be understood that within the scope of the appended claims the invention may be practiced otherwise than as specifically described.

I claim:

1. A method of obtaining a continuous indication of the velocity of precipitation from an IF portion of a radar system wherein the IF portion has a center frequency comprising:
   applying said IF portion of the radar system to a discriminator;
   detecting instantaneous frequency variations from the center frequency with the discriminator by
   a. splitting the IF portion into a first and second signal,
   b. delaying said first signal, and
   c. applying said second signal and said delayed first signal to a phase detector for providing an output voltage from the discriminator, which voltage is proportional to frequency variations from the center frequency and indicative of the velocity of precipitation.

2. The method as described in claim 1 further comprising: displaying the voltage proportional to said detected frequency variations.

3. A method of detecting the velocity of precipitation from the return IF signal of Doppler radar comprising:
   receiving the IF signal from the Doppler radar;
   amplifying and limiting the IF signal to remove amplitude variations therein;
   splitting the amplified and limited IF signal into a first and second part;
   delaying said first part by a phase of $n \times 90°$ ($n = 1, 3, 5, 7$) to establish a reference voltage corresponding to zero precipitation velocity;
   comparing said delayed first part with said second part to produce a signal representing any phase variations from said reference, which variations are proportional to the precipitation velocity; and
   amplifying said signal representing the variations.

* * * * *